(12) United States Patent
Yong et al.

(10) Patent No.: US 8,264,587 B2
(45) Date of Patent: Sep. 11, 2012

(54) INCREASING FRAME RATE FOR IMAGING (75) Inventors: Sinhung Yong, Fleet (GB); Juha Rautiainen, Fleet (GB); Martti Ilmoniemi, Tampere (FI)

(73) Assignee: Nokia Corporation, Espoo (FI)

( * ) Notice: Subject to any disclaimer, the term of this patent is extended or adjusted under 35 U.S.C. 154(b) by 726 days.

(21) Appl. No.: 12/321,371

(22) Filed: Jan. 15, 2009

(65) Prior Publication Data

US 2010/0177246 A1 Jul. 15, 2010

(51) Int. Cl.
*H04N 5/222* (2006.01)
*H04N 5/228* (2006.01)

(52) U.S. Cl. .......... 348/333.12; 348/207.99; 348/222.1; 348/333.01

(58) Field of Classification Search ............ 348/207.99, 348/222.1, 333.11, 333.12
See application file for complete search history.

(56) References Cited

U.S. PATENT DOCUMENTS

| | | | | |
|---|---|---|---|---|
| 5,828,381 | A * | 10/1998 | Penna | 345/473 |
| 6,004,243 | A * | 12/1999 | Ewert | 482/8 |
| 6,847,388 | B2 * | 1/2005 | Anderson | 715/854 |
| 6,992,676 | B2 * | 1/2006 | Inuzuka et al. | 345/555 |
| 7,034,868 | B2 * | 4/2006 | Sasaki | 348/222.1 |
| 7,362,970 | B2 | 4/2008 | Atsumi et al. | 396/429 |
| 7,557,833 | B2 * | 7/2009 | Okawa | 348/220.1 |
| 7,679,657 | B2 * | 3/2010 | Morita | 348/240.2 |
| 2007/0216948 | A1 * | 9/2007 | Kaikumaa | 358/1.16 |

* cited by examiner

*Primary Examiner* — Ngoc-Yen Vu
(74) *Attorney, Agent, or Firm* — Alston & Bird LLP (57) ABSTRACT

The specification and drawings present a new method, apparatus and software product for implementing algorithms for improving a frame rate by reducing a size and resolution of selected versus unselected image frames captured by a sensor in an image processing pipeline before displaying (or before encoding) in electronic devices (e.g., cameras, wireless camera phones, etc.), according to various embodiments of the present invention.

17 Claims, 4 Drawing Sheets

INCREASING FRAME RATE FOR IMAGING

TECHNICAL FIELD

The present invention relates generally to image processing in cameras and electronic devices and, more specifically, to improving frame rate by reducing a size and a resolution of selected video image frames in an image processing pipeline before displaying or encoding.

BACKGROUND ART

Image processing in current digital camera systems is done either by using a hardware (HW) implementation, a software (SW) implementation or their combination thereof. The HW implementation can be integrated to a camera head, a system IC (integrated circuit) or be a separate component. The HW implementation is typically fast and can achieve high frame rates for real time operations like viewfinder and video. The downside of the HW implementation is the added HW cost and inflexibility in regard to image quality tuning needs.

On the other hand the SW implementation of the image processing pipeline may be cost-effective and flexible, and may be tuned easily. However, a typical constraint in the SW based implementation is available processing power or MIPS (million instructions per second, a processor performance measure). Real time operations like video recording and displaying the image on a viewfinder in the SW based image processing pipeline may be especially problematic. This is because there is a fixed time budget and all operations including data transfer from camera (e.g., from an image sensor) to a display have to be done in given amount of time. For example, in order to achieve a frame rate of 15 frames per second (fps), only 66.7 milliseconds (ms) is available to perform all operations, and to achieve 30 fps only 33 ms is available, etc. To achieve such a fast processing may be problematic in low cost processor systems (especially for low-light video applications), e.g., with desired higher picture/screen resolutions.

This problem with SW implementation may be partially reduced by optimizing the image processing SW, i.e., by dropping certain image processing operations, e.g., like lens shading correction. Optimizations may be possible to a certain extent but there is a limit to what degree the processing time can be reduced because dropping image processing operations will degrade the image quality.

Another approach may be using downscaling/upscaling for all frames in the image. In this method a lot of image information may be lost and the image quality may be noticeably degraded.

DISCLOSURE OF THE INVENTION

According to a first aspect of the invention, a method may comprise: processing a plurality of image frames of an image, wherein the processing comprises reducing a size of selected image frames chosen from the plurality of image frames relative to an original or a reduced size of unselected image frames of the plurality of image frames, wherein a processing time for the selected image frames is shorter than for the unselected image frames; and correcting the selected image frames after the processing for displaying the image with a targeted frame rate and a desired quality level using interleaving of the selected and unselected image frames after the correcting or after the correcting followed by further processing of the selected and unselected image frames.

According further to the first aspect of the invention, the reducing of the size of the selected image frames may be proportional to reducing a resolution of the selected image frames, and, if the original size of the unselected image frames is reduced, the reduced size of the unselected image frames is reduced in the same proportion as a resolution of the unselected image frames.

Further according to the first aspect of the invention, the correcting may comprise: scaling up the selected image frames to be equal in size to the unselected image frames using a pre-selected method; and delaying the selected image frames by a predetermined time interval relative to the unselected image frames to maintain a constant frame rate to provide the displaying of the image with the targeted frame rate and the desired quality level.

Still further according to the first aspect of the invention, the correcting after the processing may comprise scaling up the selected image frames to be equal in size to the unselected image frames using a pre-selected method and the further processing comprises encoding of the selected and unselected image frames with subsequent storing or sending the selected and unselected frames to a desired destination for the displaying of the image with the targeted frame rate and the desired quality level.

According yet further to the first aspect of the invention, the processing may comprise processing into proper color images which comprises at least one of: a Red-Green-Blue color space format or a color space format having three color components, wherein one color component is a luminance color component and two other color components are chrominance color components.

According still further to the first aspect of the invention, a number of the selected image frames and a number of the unselected image frames may be determined automatically or inputted through a user interface.

According further still to the first aspect of the invention, a number of the selected image frames and a number of the unselected image frames may automatically vary depending on a moving speed of one or more objects in the image in order to provide the targeted frame rate and the desired quality level.

According to a second aspect of the invention, a computer program product may comprise: a computer readable medium embodying a computer program code thereon for execution by a computer processor with the computer program code, wherein the computer program code comprises instructions for performing the first aspect of the invention.

According to a third aspect of the invention, an apparatus may comprise: an image signal processor, configured to perform processing of a plurality of image frames of an image, the processing comprises reducing a size of selected image frames chosen from the plurality of image frames relative to an original or a reduced size unselected image frames of the plurality of image frames, wherein a processing time for the selected image frames is shorter than for the unselected image frames; and a frame synchronization controller, configured to provide a selection signal to choose the selected image frames, wherein the apparatus is configured to provide correcting the selected image frames after the processing in order to display the image with a targeted frame rate and a desired quality level using interleaving of the selected and unselected image frames after the correcting or after the correcting followed by further processing of the selected and unselected image frames.

Still yet further according to the first aspect of the invention, the apparatus may further comprise: a display image scalar, configured to scale up, after performing the processing, the selected image frames to be equal in size to the unselected image frames using a pre-selected method as a part of the correcting.

Further according to the third aspect of the invention, the apparatus may further comprise: a delay unit, configured to delay the selected image frames, after performing the processing, by a predetermined time interval relative to the unselected image frames to maintain a constant frame rate as a part of the correcting to provide the displaying of the image.

Still further according to the third aspect of the invention, the apparatus may further comprise: an encoder, configured to perform the further processing by encoding the selected and unselected image frames which is followed by storing or sending the selected and unselected frames to a desired destination for the displaying of the image.

According yet further to the third aspect of the invention, the plurality of image frames may be raw image data and the apparatus may comprise a sensor configured to provide the raw image data signal. Still further, the sensor may be a complimentary metal oxide semiconductor or a charged-couple device.

According still further to the third aspect of the invention, the image signal processor and the frame synchronization controller may be combined in one unit or a processor.

According yet further still to the third aspect of the invention, a camera or an electronic device comprising a camera may comprise the image signal processor and the frame synchronization controller.

Still yet further according to the third aspect of the invention, wherein, during the processing, the selected image frames may be reduced to a size of 160×120 pixels, and the unselected image frames of the plurality of image frames may be reduced to a size of 320×240 pixels.

According further still to the third aspect of the invention, each of the selected image frames may be chosen to be every second frame from the plurality of image frames.

Yet still further according to the third aspect of the invention, the apparatus may be configured to determine using a processor performance measure of the image signal processor in order to achieve the targeted frame rate and the desired quality level at least one of: a number of the selected image frames and a number of the unselected image frames, and a size of the selected image frames and a size of the unselected image frames.

According to a fourth aspect of the invention, a processor may comprise: an image signal processor, configured to perform processing of a plurality of image frames of an image, the processing comprises reducing a size of selected image frames chosen from the plurality of image frames relative to an original or a reduced size of unselected image frames of the plurality of image frames, wherein a processing time for the selected image frames is shorter than for the unselected image frames; and a frame synchronization controller, configured to provide a selection signal to choose the selected image frames, wherein the apparatus is configured to provide correcting the selected image frames after the processing in order to display the image with a targeted frame rate and a desired quality level using interleaving of the selected and unselected image frames after the correcting or after the correcting followed by further processing of the selected and unselected image frames.

BRIEF DESCRIPTION OF THE DRAWINGS

For a better understanding of the nature and objects of the present invention, reference is made to the following detailed description taken in conjunction with the following drawings, in which:

FIGS. 3a-3c are timing diagrams demonstrating alternating one full size unselected image frame (or one reference size frame corresponding to a user requested video image size) with three reduced size selected image frames, according to an embodiment of the present invention.

MODES FOR CARRYING OUT THE INVENTION

A new method, apparatus and software product are presented for implementing algorithms for improving (i.e., increasing) a frame rate by reducing a size and resolution (i.e., size/resolution) of selected (or chosen) versus unselected image frames captured by a sensor in an image processing pipeline before displaying (or before encoding stage) in electronic devices (e.g., cameras, wireless camera phones, etc.), according to various embodiments of the present invention.

Indeed, the amount of processed pixels by an image signal processor (ISP) in a SW (software) imaging pipeline (which, for example, may be processing the captured raw image data into proper color images) may be reduced by decreasing the size and resolution of the output for the selected frames by selecting signals from certain pixels and discarding others (e.g., by selecting signals of only every second (third or forth, etc.) row or column of pixels in these selected frames). This may reduce a processing time significantly in the ISP thus reducing a processor load. After processing, the selected reduced frames may be corrected before displaying (e.g., real time displaying on a viewfinder), or further processing. For example, the selected reduced frames may be scaled up to be equal in size to a reference size of unselected frames (i.e., a full or reduced size of unselected frames, i.e., reduced to a user requested video image size) using a fast upscaling operation as known in the art. Also, in order to avoid jumpy video image displayed on a display/viewfinder, the selected frames may be further corrected by buffering, i.e., delaying, in order to get the frame timing to match in real time by maintaining a constant display frame rate (as illustrated in FIGS. 2b-2c and 3b-3c described herein).

It is further noted that the unselected image frames may have the original full size (e.g., corresponding to the total number of pixels of the sensor) or the reduced size by selecting signals from certain pixels and discarding others (e.g., by selecting signals of every other row or column of pixels in these unselected frames). But even when the unselected image frames are reduced, their size should be larger (i.e., comprising more pixels) than the selected image frames. Using unselected frames with the reduced size may further reduce the processing time in the ISP.

According to an embodiment of the present invention, in order to keep a good image quality, alternate unselected image frames (also known as base frames or intra-frames)

having the reference size and selected image frames (also known as inter-frames or delta frames) having the reduced size may be interleaved. This interleaving may provide a higher frame rate without significant loss of the video image quality. The quality level of the image may be dependent on the targeted frame rate and the number of selected frames between the unselected frames, as well as on the quality (e.g., related to the resolution determined by a number of original pixels left in those frames) of the selected image frames and/or of the unselected image frames.

Generally, the number of the selected image frames may be chosen to be larger than, to be equal to or to be smaller than the number of interleaving unselected image frames. For example, an alternating frequency of this interleaving may correspond to having, e.g., every second reference size (e.g., full size) image frame, every third reference size (e.g., full size) image frame, etc. Another scenario may be, e.g., having an even number (e.g., 2) of the unselected image frames followed by a larger uneven number (e.g., 3) of the selected image frames, or an uneven number (e.g., 3) of the unselected image frames followed by a smaller even number (e.g., 2) of the selected image frames. Alternatively, the number of unselected image frames may be chosen to be larger than the number of the selected image frames, e.g., two unselected image frames may be followed by one selected image frame, or three unselected image frames may be followed by one or two selected image frames, etc.

The trade-off decision for choosing the alternating number of the selected and unselected image frames chosen for this interleaving may depend on a targeted frame rate, on a desired quality level of the video image, on the available MIPS (million instructions per second, processor performance measure) of the ISP since the SW-ISP computational power requirement may be directly proportional to the output image size, e.g., to the number of pixels in the output image (a smaller image will take less time to process than a bigger image), etc.

According to another embodiment, the size (e.g., a number of pixels in two perpendicular directions of the sensor) of the selected frames and the size of the unselected frames (having, e.g., an original size captured by the sensor, or a reduced size) may be chosen in a broad range based on a system request/requirements, a user request (provided, e.g., through a user interface), the total number of pixels in the sensor capturing the image, the available MIPS of the ISP and/or desired image quality level (wherein the size of the selected frames is smaller compared to the size of the unselected frames, as described herein).

Moreover, according to a further embodiment, since the frame rate and image quality are two desirable parameters, then the number of the selected and unselected image frames and/or their sizes (i.e., the number of pixels) may be chosen, e.g., based on the available MIPS of the ISP.

Moreover, the number of selected vs. unselected image frames may be determined automatically by the electronic device (or the electronic device comprising camera) using available processing power (e.g., measured by the MIPS) of the ISP or may be inputted by a user through a user interface (UI). Furthermore, the number of selected versus unselected frames may be variable (i.e., their ratio may be a variable parameter) and chosen automatically by the electronic device (e.g., by a camera control system software) depending, for instance, on a moving speed of one or more objects in the image in order to provide, e.g., the targeted frame rate and the desired quality level.

According to another embodiment, improving the frame rate by reducing the size/resolution of the chosen selected frames in the image processing pipeline may be further used for further processing, e.g., for encoding stage with subsequent storing the image data (which may be displayed later if requested) or sending the encoded image data, processed according to embodiments of the present invention, to a desired destination.

Thus, according to an embodiment of the present invention, a time required for processing a plurality of image frames (or video image frames) of an image (e.g., provided by a sensor as a raw image data signal) may be decreased by reducing the size/resolution of the selected image frames chosen from said plurality of image frames relative to an original or a reduced size/resolution of unselected image frames of said plurality of image frames, thus reducing the processing time for the selected image frames compared with the processing time required for the unselected image frames. Then after correcting the selected image frames following this processing (the correcting may include a time correction and upscaling) this image with the targeted frame rate and the desired quality level may be displayed (e.g., on a viewfinder or a touch screen) using interleaving of the corrected selected image frames and unselected image frames. Also after this correction, a further processing of the selected and unselected image frames may be performed (e.g., encoding with subsequent storing or sending these selected and unselected frames to a desired destination).

Figure 1:
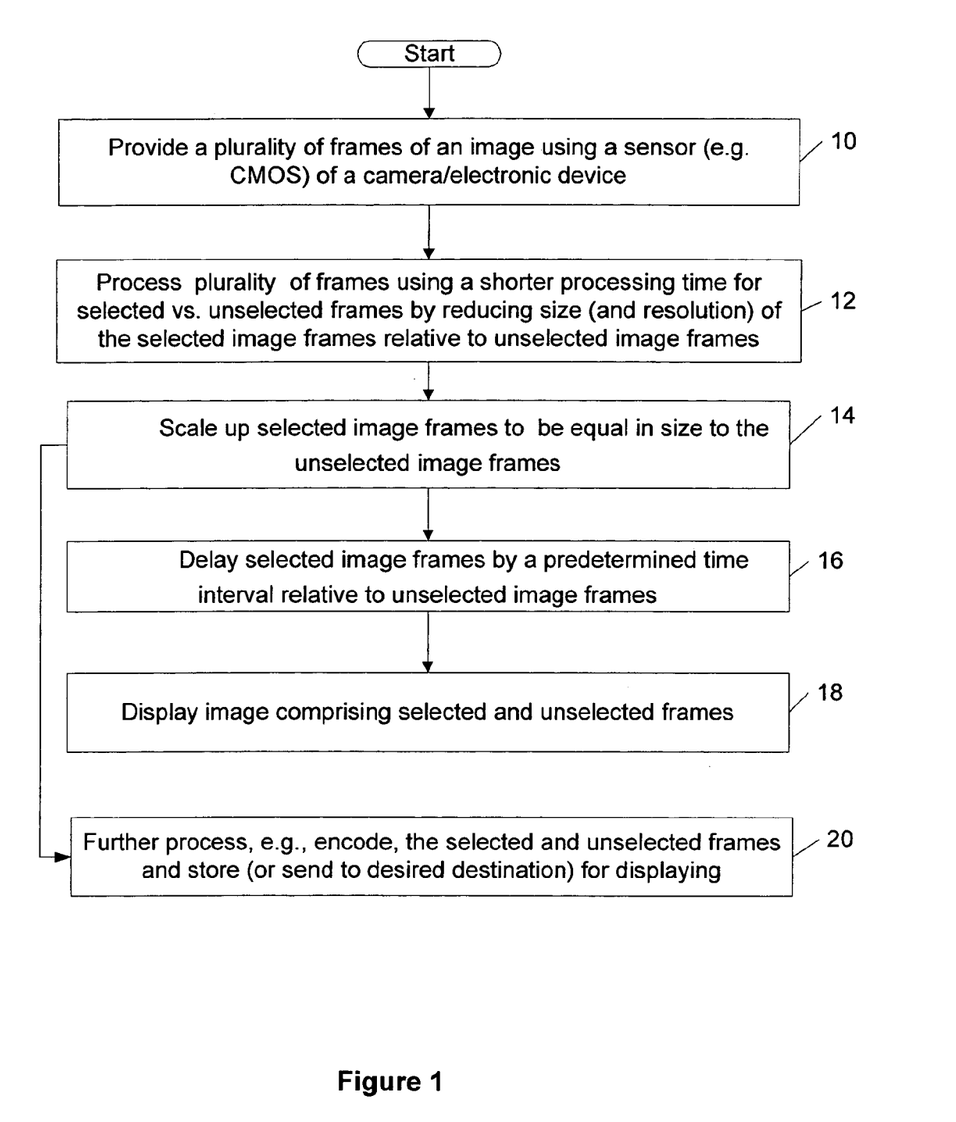
FIG. 1 is a flow chart for implementing an algorithm for improving a frame rate by reducing a size/resolution of selected image frames in an image processing pipeline before displaying (or before an encoding stage), according to an embodiment of the present invention.

FIG. 1 shows a flow chart for implementing an algorithm for improving a frame rate by reducing a size/resolution of selected image frames in an image processing pipeline before displaying (or before encoding stage), according to an embodiment of the present invention.

The flow chart of FIG. 1 only represents one possible scenario among others. It is noted that the order of steps shown in FIG. 1 is not absolutely required, so in principle, the various steps may be performed out of order. In a method according to the embodiment of the present invention, in a first step 10, a video image may be captured using a sensor, e.g., such as a CMOS (complimentary metal oxide semiconductor), a CCD (charge-coupled device) or other applicable sensors, of a camera or an electronic device (e.g., a camera-phone for wireless communications) to provide a plurality of image frames, e.g., a raw image data signal in a Bayer image format, to an image signal processor (ISP) or a software ISP (SW-ISP). The resolution of the output raw image may be slightly bigger than the user requested video image size.

In a next step 12, the plurality of captured frames (e.g., raw image data signal) may be processed by the ISP using a shorter processing time for selected frames (known as inter-frames or delta frames) vs. unselected (known as base frames or intra-frames) frames by reducing the size and resolution (size/resolution) of the selected image frames relative to unselected image frames (or referenced size frames), according to an embodiment of the present invention described herein.

Generally, the size (e.g., a number of pixels in two perpendicular directions of the sensor) of the selected frames and the size of the unselected frames (having, e.g., an original size captured by the sensor, or a reduced size) may be chosen in a broad range based on a system request/requirements, a user request (provided, e.g., through a user interface), the total number of pixels in the sensor capturing the image, the available MIPS of the ISP and a desired image quality level, as described herein.

For example, the unselected reference size frames provided by the CMOS sensor may be processed in step 12 in such a way that their size may be, reduced to a size of a QVGA (quarter video graphic array) image frame thus comprising 320×240 pixels, whereas the selected image frames may be reduced to a size of QQVGA (quarter QVGA) image frame, having 160×120 pixels. Since reduction in the image frame size (e.g., by selecting certain rows and columns and discarding others) may generally be proportional to the reduction in the resolution, then the term "reducing size/resolution" means reducing both size and resolution by the same proportional value in the context of various embodiments of the present invention.

Figures 3A, 3C:
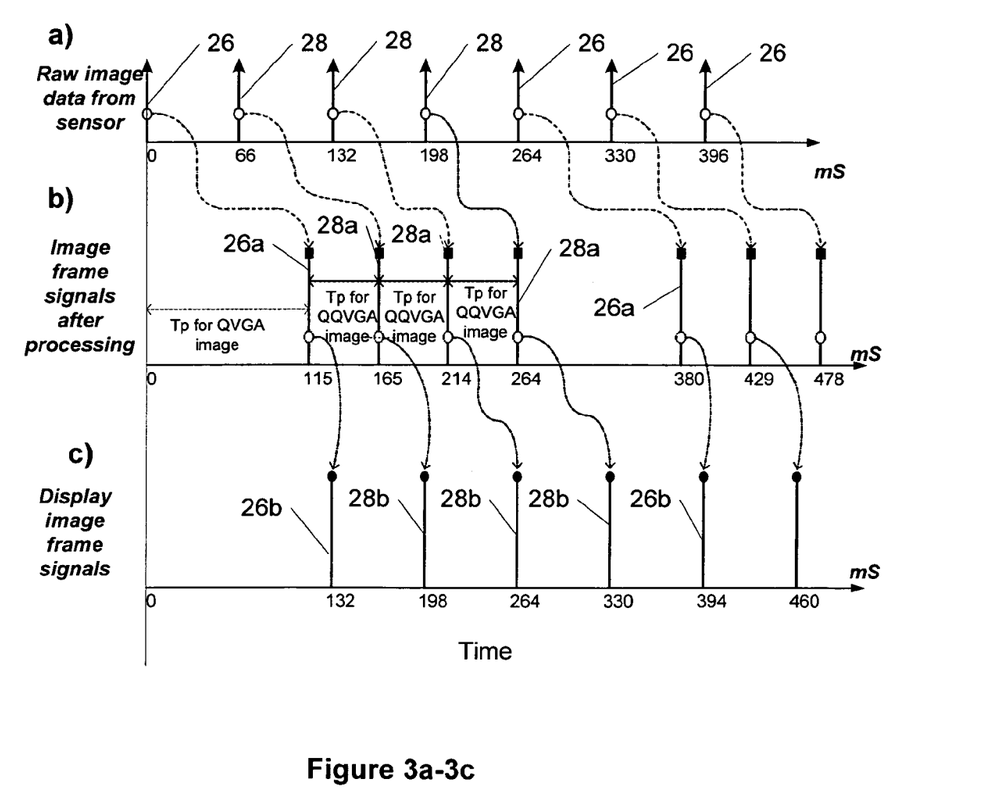
Figure 4:
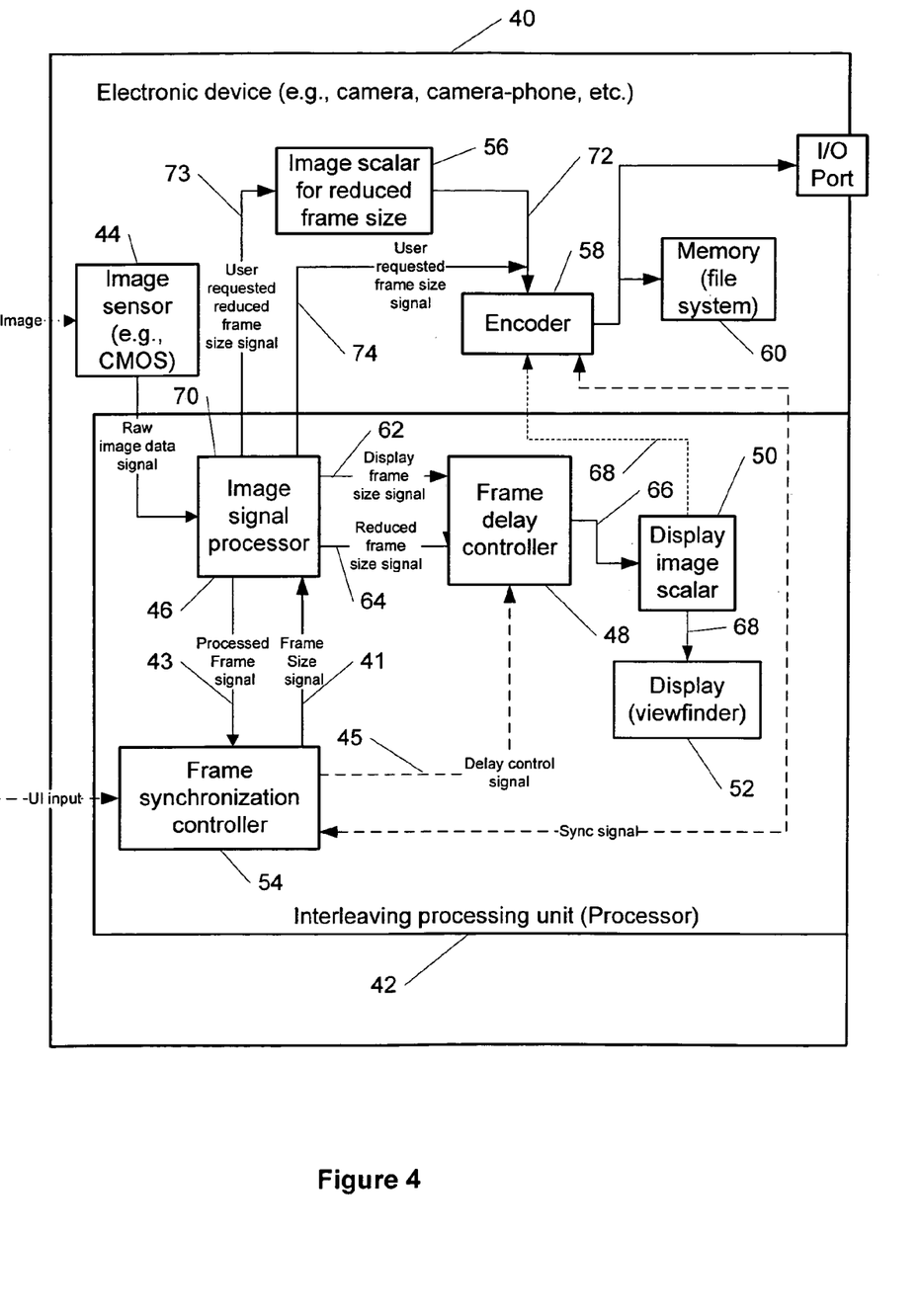
FIG. 4 is a block diagram of an electronic device (e.g., a camera, a camera phone, etc.) for improving a frame rate by reducing a size/resolution of selected image frames in an image processing pipeline before displaying (or before encoding stage), according to an embodiment of the present invention.

The output image frame resolution and size provided by the ISP may be dependent upon the instruction provided by a frame synchronization controller (FSC, e.g., shown as module 54 in FIG. 4) using an appropriate command (as shown in FIG. 4), and the reduced image frame signal corresponding to the elected image frames may have a shorter processing time then for the unselected image frames as demonstrated in examples of time diagrams of the output image frames signals generated in step 12 as shown in FIGS. 3b and 3b and further described herein.

It is also noted that the number of unselected vs. selected image frames (e.g., per second) may vary in a broad range based on the targeted frame rate, the desired quality level and the available MIPS of the ISP, and the number of the selected image frames may be chosen to be larger than, to be equal to or to be smaller than the number of the unselected image frames as described herein. Also, according to another embodiment, the number of the selected vs. unselected image frames may be determined automatically by the camera/device or inputted by a user through the UI (e.g., by providing a UI input to the FSC 54 as shown in FIG. 4), or may be a variable parameter chosen automatically by a camera/device depending, for example, on a moving speed of an image (object) in order to balance, e.g., the targeted frame rate and the desired quality level.

A processing function of selected and unselected image frame signals performed by the ISP in step 12 of FIG. 1 may be, e.g., processing the captured raw image frame data signal into a proper color space format, e.g., RGB (red-green-blue) color space format or a color space format having 3 color components, wherein one color component is a luminance color component and two other color components are chrominance color components (e.g., YUV format).

In a next step 14, the selected image frames may be scaled up to be equal in size to the unselected image frames using, e.g., an image scalar (for displaying the image or for further processing) as shown in FIG. 4 (see modules 50 and 56) and as known in the art: the up-scaling may be performed, e.g., by averaging of or copying adjacent pixel values to added pixels. After step 14, the process may go to step 20 (for further processing/encoding/storing as further discussed herein) or to step 16.

In a next step 16, the selected image frames may be buffered, i.e., delayed by a predetermined time interval relative to the unselected image frames using, e.g., a frame delay controller (e.g., shown as module 48 in FIG. 4) in order to avoid jumpy video image displayed on a display/viewfinder (i.e., to get the frame timing to match in real time by maintaining a constant display frame rate as illustrated in FIGS. 2b-2c and 3b-3c described herein). In a next step 18, an image comprising interleaving selected and unselected frames with a faster frame-rate may be displayed (e.g., on a viewfinder of a camera).

In step 20 of FIG. 1, a further processing, e.g., encoding the selected and unselected frames may be performed with subsequent storing or sending the encoded plurality of frames to a desired destination for possible displaying. For example, in step 20, a video encoder (for example, see module 58 in FIG. 4) may encode the YUV frames into a compressed video format file, i.e., MP4/3GPP (Moving Picture Expert Group-4/3d Generation Partnership Project) video format. The compression may be basically done by generating a high quality video base frame known as intra-frame (or unselected frame) which is followed by one or more changed delta video frames (or selected frames) processed and corrected according to various embodiments of the present invention. This process may be communicated to the FSC (shown as module 54 in FIG. 4) via a sync signal 45 which in turn, synchronizes the ISP output frame resolution, so that user requested image size is produced for the intra-frames to be encoded, as disclosed herein. Alternatively, the FSC can provide the sync signal to the encoder.

Steps 10, 12, 16 and 18 of FIG. 1 may be illustrated using timing diagrams shown in FIGS. 2a-2c and 2a-3c as examples of many scenarios which may be used as described herein.

Figures 2A, 2B, 2C:
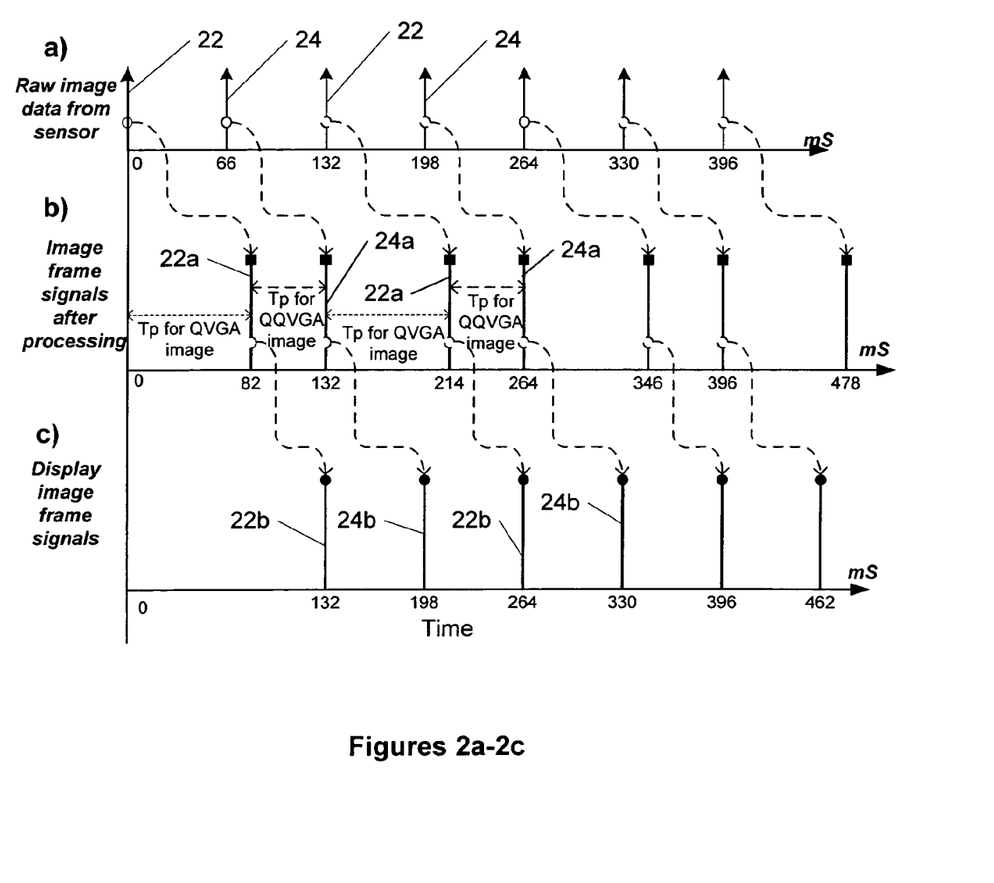
FIGS. 2a-2c are timing diagrams demonstrating alternating one full size unselected image frame (or one reference size frame corresponding to a user requested video image size) with one reduced size selected image frame, according to an embodiment of the present invention.

FIGS. 2a-2c show an example among others of timing diagrams demonstrating alternating one full size unselected image frame 22 (or one reference size frame corresponding to a user requested video image size) with one reduced size selected image frame 24, according to an embodiment of the present invention.

FIG. 2a shows raw image data frames from a sensor as time dependent frame signals 22 and 24 separated by 66 milliseconds (ms) which corresponds to the frame rate of about 15 frames per second (fps). FIG. 2b shows a time diagram of selected frames 24a corresponding to the QQVGA image frame size (160×120 pixels) and unselected frames 22a corresponding to the QVGA image frame size (320×240 pixels), respectively, after processing by the ISP (per step 12 in FIG. 1), wherein the processing time for the selected frames 24a is about 32 ms shorter than for the unselected frames 22a. Finally, FIG. 2c shows image frame signals (per step 16 in FIG. 1) of unselected and selected image frames 22b and 24b which are all separated by 66 ms as raw data image frames which corresponds to the frame rate of about 15 fps, respectively, such that after the time delay compensation and size correction described herein, the interleaved unselected and selected image frames 22b and 24b may be displayed on a display/viewfinder (per step 18 in FIG. 1).

FIGS. 3a-3c show another example among others of timing diagrams demonstrating alternating one full size unselected image frame 26 (or one reference size frame corresponding to a user requested video image size) with three reduced size selected image frames 28, according to an embodiment of the present invention.

FIG. 3a shows raw image data frames from a sensor with time frame signals 26 and 28 separated by 66 milliseconds (ms) which corresponds to the frame rate of about 15 frames per second (fps). FIG. 3b shows a time diagram for selected frames 28a corresponding to the QQVGA image frame size (160×120 pixels) and unselected frames 26a corresponding to the QVGA image frame size (320×240 pixels), respectively, after processing by the ISP (per step 12 in FIG. 1), wherein the processing time for the selected frames 24a is about 65 ms shorter than for the selected frames 22a. Finally, FIG. 3c shows image frame signals (per step 16 in FIG. 1) of unselected and selected image frames 26b and 28b which are all separated by 66 ms as raw data image frames which corresponds to the frame rate of about 15 fps, respectively, such that after the time delay compensation and size correction described herein, the interleaved unselected and selected image frames 26b and 28b may be displayed on a display/viewfinder (per step 18 in FIG. 1).

FIG. 4 shows an example among others of a block diagram of an electronic device 40 (e.g., a camera, a camera phone for wireless applications, etc.) for improving a frame rate by reducing a size/resolution of selected image frames in an image processing pipeline before displaying (or before encoding stage) as described herein (e.g. see FIG. 1), according to an embodiment of the present invention.

The electronic device 40 may comprise an image sensor 44 (e.g., the CMOS sensor, the CCD sensor or other applicable sensors), for capturing the image (a lens optics for collecting the image on a sensor surface is not shown in FIG. 4) to provide a raw image data signal (e.g., raw Bayer image signal) to an interleaving processing unit (or processor) 42 and, in particular, to an image signal processor (ISP) 44 (e.g., a software ISP). The processor 42 may be a dedicated module or it may be incorporated within other processing modules of the electronic device 40. The processor 42 may further comprise a frame synchronization controller (FSC) 54, a frame delay controller 48 and a display image scalar 50.

The FSC 54 may be used for controlling the output size/resolution of the processed video frames and synchronize the scaling operations to be done on the frames before displaying and/or encoding, as described herein (e.g., see a flow chart of FIG. 1). The ISP 46 may provide processing of selected images frames (inter-frames) with a reduced size/dimension and unselected image frames (intra-frames), as described herein in regard to step 12 of FIG. 1, by using an instruction given by the frame synchronization controller (FSC) 54 via the frame size signal 41. The ISP 46 may inform the FSC 54 when the instructed frame is produced via processed frame signal 43. Then the ISP 46 may provide two processed frame signals, a display frame size signal 62 (corresponding to the unselected image frames) and a reduced frame size signal 64 (corresponding to the selected image frames).

The frame delay controller 48 may provide a delay of the selected image frames (e.g., using buffering) by a predetermined time interval relative to the unselected image frames in order to get the frame timing to match in real time by maintaining a constant display frame rate, as described herein in regard to step 16 of FIG. 1. The display image scalar 50 may be used for scaling up the selected image frames to be equal in size to the unselected image frames as described herein in regard to step 14 of FIG. 1, e.g., by averaging of or copying adjacent pixel values to added pixels. It is noted that the scalar 50 in principle may scale up (or down) the unselected image frames in a similar manner as discussed herein for the selected image frames to comply with user requested frame size for the unselected frames. It is further noted that according to a further embodiment, the order for performing steps 14 and 16 of FIG. 1 implemented using the corresponding modules 50 and 48 of FIG. 4 may be interchanged (because scaling operation may be fast and would not have a practical impact on the delay of the up-scaled image frames.

The display image scalar 50 may provide an input signal 68 to a display (e.g., a viewfinder) 52 such as a liquid crystal display (LCD) in order to display (e.g., in real time) the image comprising interleaved selected and unselected frames with a faster frame-rate, as described herein in regard to steps 16 and 18 of FIG. 1. After step 14, the process may go to step 20 (for further processing/encoding/storing as further discussed herein) or to step 16.

However, according to another embodiment, the display image scalar 50 may also provide the signal 68 to the encoder 58 for further processing, e.g., encoding the selected and unselected image frames with subsequent storing in a memory 60 or sending the encoded plurality of image frames to a desired destination using input/output (I/O) port for possible displaying/storing/still further processing.

The encoding by the encoder 58 may be performed as described herein in regard to step 20 of FIG. 1. For example, the video encoder 58 may encode the YUV frames into a compressed video format file such as MP4/3GPP (moving picture expert group-4/3d generation partnership project) video format as described herein. This process may be communicated to the FSC 54 via a sync signal 45 which in turn, may synchronize the selection of the frame size/resolution, so that user requested image size may be produced for the intra-frames to be encoded, as disclosed herein. In an alternative implementation, the FSC 54 can provide the sync signal 45 to the encoder 58.

However, if a color space format (e.g., YUV format) requested for encoding and storing (and/or sending to a desired destination) of the video image signal may be different from a color space format (e.g., RGB or black and white) of the video image signal requested, e.g., for the real-time displaying (on the display 52), then the signal for encoding provided to the encoder 58 may be processed differently, i.e., without using the signal 68 as an input.

Then if that is the case, according to a further embodiment of the present invention, the image signal processor 46 (alternatively, it may be another dedicated processor) may provide processing of the selected images frames (inter-frames) with a reduced size/dimension and unselected image frames (intra-frames), as described herein in regard to step 12 of FIG. 1, and provide two processed image frame signals, a user requested frame size signal 73 (corresponding to the unselected image frames) and user requested reduced frame size signal 74 (corresponding to the selected image frames). Apparently, in this scenario, the signals 73 and 74 may be generated by the ISP 46 for a different color space format than the signals 62 and 64. However, it is noted that conversion from e.g., the RGB to YUV (or from the YUV to the RGB) color space format may be a standard fast conversion which would not require much of SW power (alternatively this conversion may be performed as a part of encoding procedure or just before the encoding by an additional processor). The operation of the image scalar for reduced frame image 56 is similar to the operation of the display image scalar 50, as described herein.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention may be provided as a computer program product comprising a computer readable storage structure (or a computer readable medium) embodying a computer program code (i.e., the software or firmware) thereon for execution by the computer processor.

It is noted that various embodiments of the present invention recited herein may be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:
1. A method comprising:
    processing a plurality of image frames of an image, wherein said processing comprises reducing a size of selected image frames chosen from said plurality of image frames relative to an original or a reduced size of unselected image frames of said plurality of image frames, wherein a processing time for said selected image frames is shorter than for the unselected image frames; and correcting said selected image frames after said processing for displaying said image with a targeted increased frame rate and a desired quality level using interleaving of said selected and unselected image frames after said correcting or after said correcting followed by further processing of said selected and unselected image frames, wherein said correcting comprises:

scaling up said selected image frames to be equal in size to said unselected image frames using a pre-selected method; and delaying said selected image frames by a predetermined time interval relative to said unselected image frames to maintain a constant frame rate to provide said displaying of said image with the targeted frame rate and the desired quality level.

2. The method of claim 1, wherein said reducing of the size of the selected image frames is proportional to reducing a resolution of said selected image frames, and, if the original size of the unselected image frames is reduced, said reduced size of the unselected image frames is reduced in the same proportion as a resolution of the unselected image frames.

3. The method of claim 1, wherein said correcting after said processing comprises scaling up said selected image frames to be equal in size to said unselected image frames using a pre-selected method and said further processing comprises encoding of said selected and unselected image frames with subsequent storing or sending said selected and unselected frames to a desired destination for said displaying of said image with the targeted frame rate and the desired quality level.

4. The method of claim 1, wherein said processing comprises processing into proper color images which comprises at least one of: a Red-Green-Blue color space format or a color space format having three color components, wherein one color component is a luminance color component and two other color components are chrominance color components.

5. The method of claim 1, wherein a number of the selected image frames and a number of the unselected image frames is determined automatically or inputted through a user interface.

6. The method of claim 1, wherein a number of the selected image frames and a number of the unselected image frames automatically vary depending on a moving speed of one or more objects in said image in order to provide the targeted frame rate and the desired quality level.

7. A non-transitory computer readable medium embodying a computer program code thereon for execution by a computer processor with said computer program code, wherein said computer program code comprises instructions for performing the method of claim 1.

8. An apparatus, comprising:

an image signal processor, configured to perform processing of a plurality of image frames of an image, said processing comprises reducing a size of selected image frames chosen from said plurality of image frames relative to an original or a reduced size unselected image frames of said plurality of image frames, wherein a processing time for said selected image frames is shorter than for the unselected image frames;

a frame synchronization controller, configured to provide a selection signal to choose said selected image frames, wherein said apparatus is configured to provide correcting said selected image frames after said processing in order to display said image with a targeted increased frame rate and a desired quality level using interleaving of said selected and unselected image frames after said correcting or after said correcting followed by further processing of said selected and unselected image frames;

a display image scalar, configured to scale up, after performing said processing, said selected image frames to be equal in size to said unselected image frames using a pre-selected method as a part of said correcting; and a delay unit, configured to delay said selected image frames, after performing said processing, by a predetermined time interval relative to said unselected image frames to maintain a constant frame rate as a part of said correcting to provide said displaying of said image.

9. The apparatus of claim 8, further comprising:

an encoder, configured to perform said further processing by encoding said selected and unselected image frames which is followed by storing or sending said selected and unselected frames to a desired destination for said displaying of said image.

10. The apparatus of claim 8, wherein said plurality of image frames is raw image data and the apparatus comprises a sensor configured to provide said raw image data signal.

11. The apparatus of claim 10, wherein said sensor is a complimentary metal oxide semiconductor or a charged-couple device.

12. The apparatus of claim 8, wherein said image signal processor and said frame synchronization controller are combined in one unit or a processor.

13. The apparatus of claim 8, wherein a camera or an electronic device comprising a camera comprises said image signal processor and said frame synchronization controller.

14. The apparatus of claim 8, wherein, during said processing, said selected image frames are reduced to a size of 160×120 pixels, and said unselected image frames of the plurality of image frames are reduced to a size of 320×240 pixels.

15. The apparatus of claim 8, wherein each of said selected image frames is chosen as being every second frame from said plurality of image frames.

16. The apparatus of claim 8, wherein the apparatus is configured to determine, using a processor performance measure of the image signal processor in order to achieve the targeted frame rate and the desired quality level at least one of:

a number of the selected image frames and a number of the unselected image frames, and a size of the selected image frames and a size of the unselected image frames.

17. A processor, comprising:

an image signal processor, configured to perform processing of a plurality of image frames of an image, said processing comprises reducing a size of selected image frames chosen from said plurality of image frames relative to an original or a reduced size of unselected image frames of said plurality of image frames, wherein a processing time for said selected image frames is shorter than for the unselected image frames;

a frame synchronization controller, configured to provide a selection signal to choose said selected image frames, wherein said apparatus is configured to provide correcting said selected image frames after said processing in order to display said image with a targeted increased frame rate and a desired quality level using interleaving of said selected and unselected image frames after said correcting or after said correcting followed by further processing of said selected and unselected image frames;

a display image scalar, configured to scale up, after performing said processing, said selected image frames to be equal in size to said unselected image frames using a pre-selected method as a part of said correcting; and a delay unit, configured to delay said selected image frames, after performing said processing, by a predetermined time interval relative to said unselected image frames to maintain a constant frame rate as a part of said correcting to provide said displaying of said image.

* * * * *